United States Patent
Xiao et al.

(10) Patent No.: US 10,033,790 B2
(45) Date of Patent: *Jul. 24, 2018

(54) METHOD FOR A CONNECTOR PROVIDING TRANSACTIONAL INTEROPERABILITY TO MULTIPLE MESSAGING PROVIDERS TO MULTIPLE APPLICATION SERVERS USING THE SAME IMPLEMENTATION

(71) Applicant: Oracle International Corporation, Redwood Shores, CA (US)

(72) Inventors: Dongbo Xiao, Edison, NJ (US); Qiang Liu, Portland, OR (US); John Leinaweaver, Aloha, OR (US); Jefferey Steidl, Portland, OR (US); Paul Parkinson, Mount Laurel, NJ (US); Thomas E. Barnes, Whitehouse Station, NJ (US); Vivekananda Maganty, Portland, OR (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 534 days.

This patent is subject to a terminal disclaimer.

(21) Appl. No.: 13/872,919

(22) Filed: Apr. 29, 2013

(65) Prior Publication Data

US 2013/0290425 A1    Oct. 31, 2013

Related U.S. Application Data

(60) Provisional application No. 61/793,043, filed on Mar. 15, 2013, provisional application No. 61/793,257, filed on Mar. 15, 2013, provisional application No. 61/793,459, filed on Mar. 15, 2013, provisional application No. 61/800,016, filed on Mar. 15, 2013, (Continued)

(51) Int. Cl.

| | |
|---|---|
| G06F 3/00 | (2006.01) |
| G06F 9/44 | (2018.01) |
| G06F 9/46 | (2006.01) |
| G06F 13/00 | (2006.01) |
| H04L 29/08 | (2006.01) |
| H04L 12/58 | (2006.01) |
| G06F 8/30 | (2018.01) |
| G06F 9/54 | (2006.01) |

(52) U.S. Cl.
CPC .............. H04L 67/00 (2013.01); G06F 8/30 (2013.01); G06F 9/541 (2013.01); G06F 9/546 (2013.01); H04L 51/06 (2013.01); H04L 67/1002 (2013.01); *G06F 2209/547* (2013.01)

(58) Field of Classification Search
None
See application file for complete search history.

(56) References Cited

U.S. PATENT DOCUMENTS

| | | | |
|---|---|---|---|
| 6,738,975 B1 * | 5/2004 | Yee et al. | 719/310 |
| 7,418,711 B1 * | 8/2008 | Lee et al. | 719/314 |

(Continued)

*Primary Examiner* — Reginald Bragdon
*Assistant Examiner* — Kimbleann Verdi
(74) *Attorney, Agent, or Firm* — Marger Johnson

(57) ABSTRACT

A system includes a resource adapter module in the form of executable code by a processor, the resource adapter module to, interact with an application running on an application server by receiving calls from applications, and provide communication between the application and any JMS provider by relaying the calls to the JMS provider.

9 Claims, 3 Drawing Sheets

Related U.S. Application Data provisional application No. 61/799,391, filed on Mar. 15, 2013, provisional application No. 61/636,786, filed on Apr. 27, 2012, provisional application No. 61/639,791, filed on Apr. 27, 2012.

(56) References Cited

U.S. PATENT DOCUMENTS

| | | | |
|---|---|---|---|
| 7,472,401 B2 * | 12/2008 | Luo et al. | 719/330 |
| 7,506,342 B2 * | 3/2009 | Mousseau et al. | 719/320 |
| 7,657,658 B2 * | 2/2010 | Tankov | G06F 9/541 |
| | | | 709/218 |
| 7,739,699 B2 * | 6/2010 | Andreeva et al. | 719/330 |
| 7,930,704 B2 * | 4/2011 | Mousseau et al. | 719/328 |
| 8,695,015 B2 * | 4/2014 | Borgendale et al. | 719/313 |
| 2005/0267918 A1 * | 12/2005 | Gatev et al. | 707/203 |

\* cited by examiner

METHOD FOR A CONNECTOR PROVIDING TRANSACTIONAL INTEROPERABILITY TO MULTIPLE MESSAGING PROVIDERS TO MULTIPLE APPLICATION SERVERS USING THE SAME IMPLEMENTATION

RELATED APPLICATIONS

This application claims benefit of provisional patent applications 61/639,786, and 61/639,791, both filed Apr. 27, 2012; and provisional patent applications 61/793,043, 61/793,257, 61/793,459, 61/800,016, and 61/799,391, all filed Mar. 15, 2013, all incorporated by reference herein their entirety.

This application is related to the following co-pending US Patent Application Nos, all filed Apr, 29, 2013, all incorporated by reference herein in their entirety:

U.S. Ser. No. 13/872,976, "SYSTEM AND METHOD FOR CLUSTERED TRANSACTIONAL INTEROPERABILITY OF MULTIPLE MESSAGING PROVIDERS USING A SINGLE CONNECTOR MECHANISM;"

U.S. Ser. No. 13/872,899, "SYSTEM AND METHOD FOR CLUSTERED TRANSACTIONAL INTEROPERABILITY OF PROPRIETARY NON-STANDARD FEATURES OF A MESSAGING PROVIDER USING A CONNECTOR MECHANISM;"

U.S. Ser. No. 13/872,919, "METHOD FOR A CONNECTOR PROVIDING TRANSACTIONAL INTEROPERABILITY TO MULTIPLE MESSAGING PROVIDERS TO MULTIPLE APPLICATION SERVERS USING THE SAME IMPLEMENTATION;"

U.S. Ser. No. 13/872,797, "SYSTEM AND METHOD FOR A CONNECTOR BEING ABLE TO ADAPT TO NEWER FEATURES INTRODUCED TO A MESSAGING PROVIDER WITH ONLY CONFIGURATION CHANGES;" and U.S. Ser. No. 13/872,822), "DYNAMIC CODE GENERATION TO DYNAMICALLY CREATE AND DEPLOY MESSAGING PROVIDER-SPECIFIC WRAPPERS FOR A RESOURCE ADAPTER."

BACKGROUND

In enterprise information systems (EIS), applications running on application servers interact with other applications running on the same or other application servers through a messaging system, typically the JAVA™ Messaging System (JMS). The JMS allows computers involved in different interactions and transactions to exchange messages to complete their respective tasks. JMS systems typically rely upon JMS providers, software developed by different companies that manage the communication sessions and message queues.

Each JMS provider typically has its own proprietary way of handling JMS tasks. When an application server, one of the users of the JMS, sends a message, it must send it in accordance with the protocols and conventions for whatever JMS provider the application is using. The JMS also must have the ability to interact with the application server according the application server's conventions and protocols.

Some relief from this issue is found in the JAVA™ Connector Architecture (JCA). Application servers typically use JCA to connect to the EIS. Even with the use of JCA, each messaging provider generally has its own connector, or resource adapter, based upon the provider's implementation of the JMS. Similarly, application servers typically have their own connectors. This results in each JMS provider having a proprietary connector, which leads to issues with interoperability and scalability as large systems may include many different JMS providers and different application server providers.

DETAILED DESCRIPTION OF THE EMBODIMENTS

Enterprise Information Systems (EIS) may consist of many different components, including application servers, web servers, messaging systems, databases, stand-alone computers running JAVA™ Virtual Machines, etc. The combinations are varied and nearly infinite. This discussion will focus on application servers and the messaging system. Messaging systems allow application servers to exchange messages to complete tasks, such as in e-commerce, inventory management, etc. Most systems employ the JAVA™ programming language because of its ability to run on all types of systems, and in turn, the EIS uses the JAVA™ Message Service (JMS). JAVA™ is a concurrent, class-based, object oriented programming language.

Figure 1:
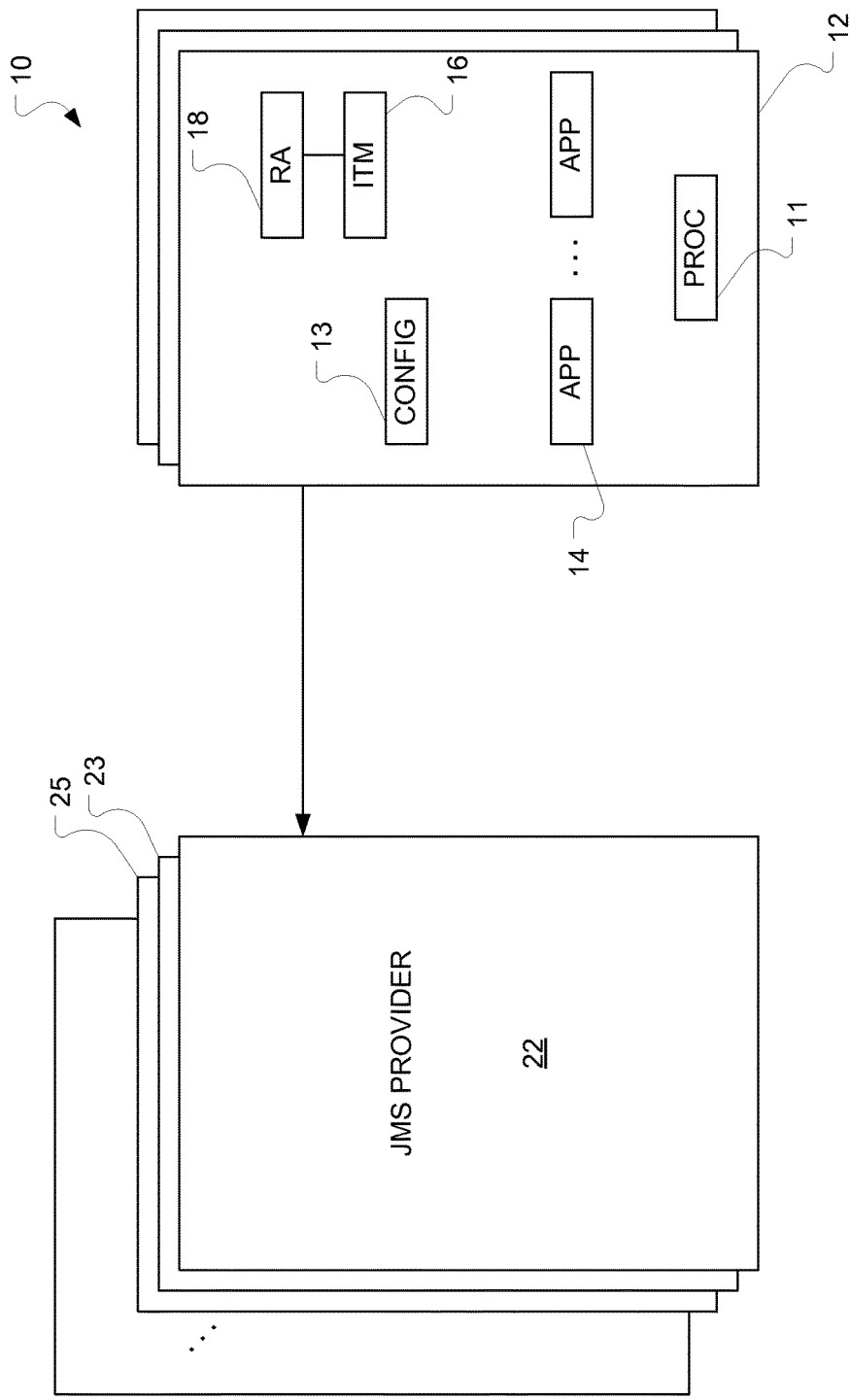
FIG. 1 shows an embodiment of an enterprise information system having a JMS provider.

FIG. 1 shows an embodiment of an enterprise information system 10 having multiple clusters. The system may take many different forms, typically a mix of application servers upon which are running applications, message servers, databases, etc. The application servers may comprise individual servers, in that each resides on its own computing device, or may comprise server instances. A server, as that term is used here, is a computer or computer program that manages access to a centralized resource or service in a network. In this embodiment, the application servers manage and process messages within the EIS. They provide these services to applications. Applications are software programs that perform tasks such as electronic commerce, inventory, customer contact management, etc.

For example, if an application server instance such as 12 is involved in a transaction, such as a customer ordering an item from a web site, the application 14 could be the user interface through which the customer identifies the item to be purchased. The application 14 would then send a message to another application that manages inventory for a particular type of product to inquire as to whether the product is available. The application that handles the product may reside on the application server (app server) 12, or may reside on another application server within a cluster of application servers. Clustering allows multiple servers or server instances to act like a single system and provide high availability and faster processing of tasks.

Alternatively, the application that handles the product may reside on a different application server. The interaction between the different applications is typically handled by a messaging system, more particularly by instances of a JAVA™ Message Service (JMS). In the embodiments discussed here, the JMS provider 22 consists of a cluster of JMS servers such as 23 and 25. The applications on the app server have no information as to the clustering of the JMS provider servers. The application server has residing upon it a resource adapter (RA) 18, also called a connector, which interacts with the cluster.

Generally, the resource adapter deployed on an application server is specific to a particular JMS provider. Most applications that send messaging requests to the resource adapter do so in accordance with a standardized message format. Similarly, the resource adapter will typically be structured in accordance with the JAVA™ Connector Architecture (JCA). However, different JMS providers implement the JCA used on their side of the transaction differently, so typically the resource adapter used will be specific to a particular JMS provider. The applications have no visibility of this, but the application server will.

It is possible, using the embodiments described here, to deploy a resource adapter, such as RA 18 in FIG. 1, that is generic to the JMS providers and still allow the JMS provider to have unique features. As will be described here and in the related applications, the RA 18, the Interposed Transaction Manager (ITM) 16 and the configuration file 13 may be provided as a 'bundle' to the application server provider. This allows the application server, regardless of the creating entity or application server vendor, to communicate with the JMS system, regardless of the JMS creating entity or vendor. The configuration file may be an XML file or other type of control file that allows the resource adapter to be updated without having to be recoded, recompiled and redeployed.

Generally, the application server will have deployed with it a transaction manager (TM) to manage the transactions and a resource adaptor (RA) or connector to provide the interface to the messaging system. One should note that the term resource adapter and connector as used here mean the same thing. The resource adapter will generally comply with the JAVA™ Connector Architecture (JCA). Most of the focus of this particular discussion will be on the resource adapter. With the development of JAVA™ 2 Enterprise Edition (J2EE™) 1.4, version 1.5 of the JCA became available. This connector provides some universal or generic connector capabilities that allow application servers to interact with several different Enterprise Information Systems including JMS providers.

Even with the standardized interface, most application server providers develop their own proprietary connectors, or resource adapters, because the JCA generic architecture does not cover many of the proprietary features. The resource adapters are generally provided through a .rar file (resource adapter archive). If the application server provider makes changes to their application servers, the .rar file needs to be recoded, recompiled and redeployed. The resource adapters provide access to resources outside the application server. The resource of interest here is a JMS.

Figure 2:
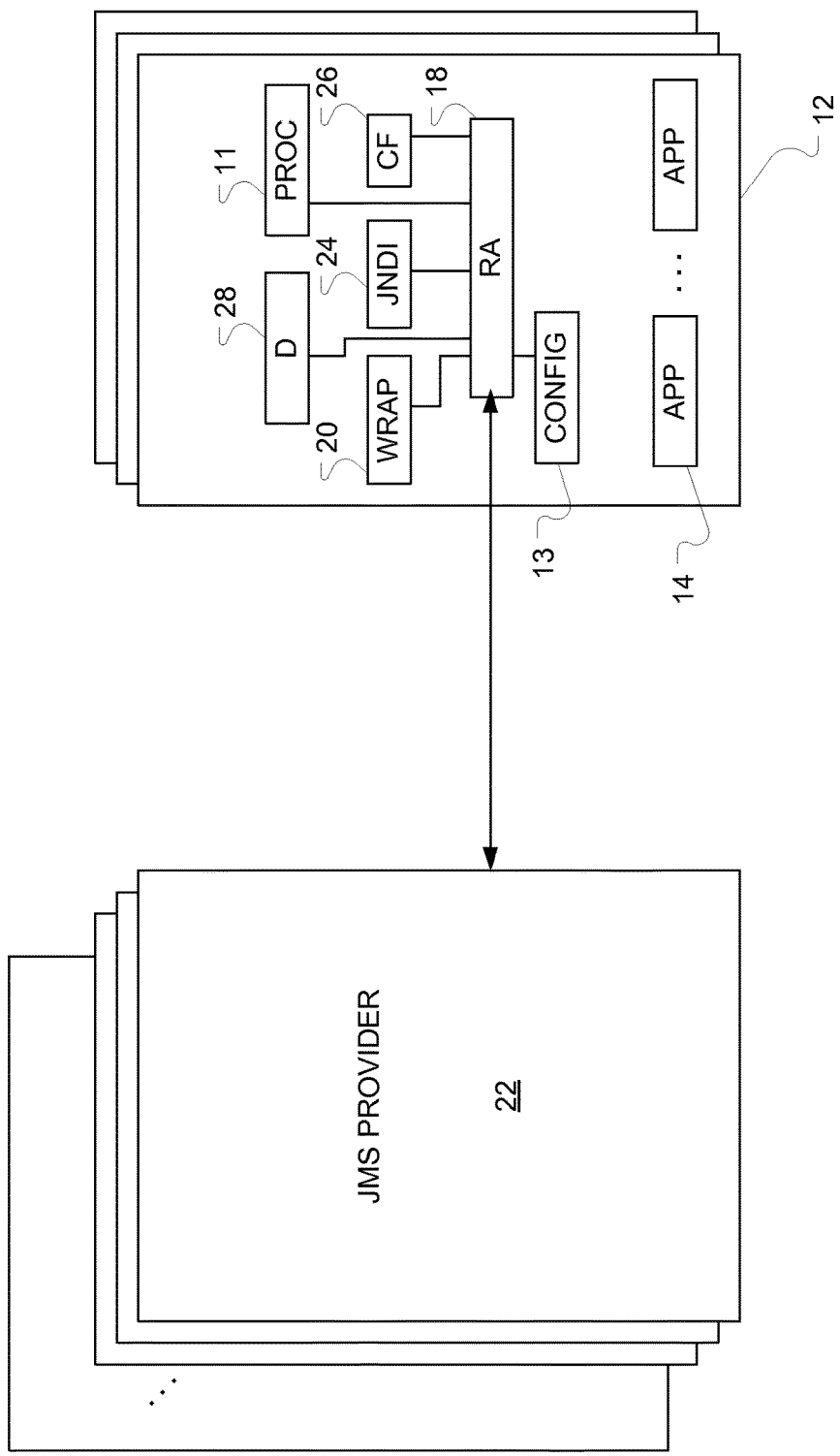
FIG. 2 shows a more detailed view of an embodiment of a resource adapter module on an application server.

Unlike the application servers above, the resource adapter 18 used in this system is 'generic' to both the application server and the JMS provider. FIG. 2 shows a more detailed view of the resource adapter 18. The resource adapter is initially coded to include the different implementations of JMS that are specific to the creating entity and/or vendor of the JMS system. It is then compiled and deployed with a configuration file 13. In one embodiment, the configuration file is an XML (eXtended Markup Language) file that is used to update and interact with the resource adapter 18 and the interposed transaction manager 16. These files are generally in the form of executable code executed on a processor such as 11 residing on one or more computers.

When an application such as 14 wants to perform any messaging operations, it sends a request or call to the resource adapter 18. The resource adapter 18 receives the call and accesses a set of 'wrappers' from a wrapper library 20 that is part of the resource adapter, shown separate here for purposes of the discussion. As used here, a 'wrapper' is a portion of additional code that wraps around the object formed from the call. Initially, the resource adapter will access the JAVA™ Name Directory Interface (JNDI) 24 to access the connection factory 26. The connection factory will establish a connection to a destination 28 to consume the messages. The resource adapter will then establish sessions across the destination.

Figure 3:
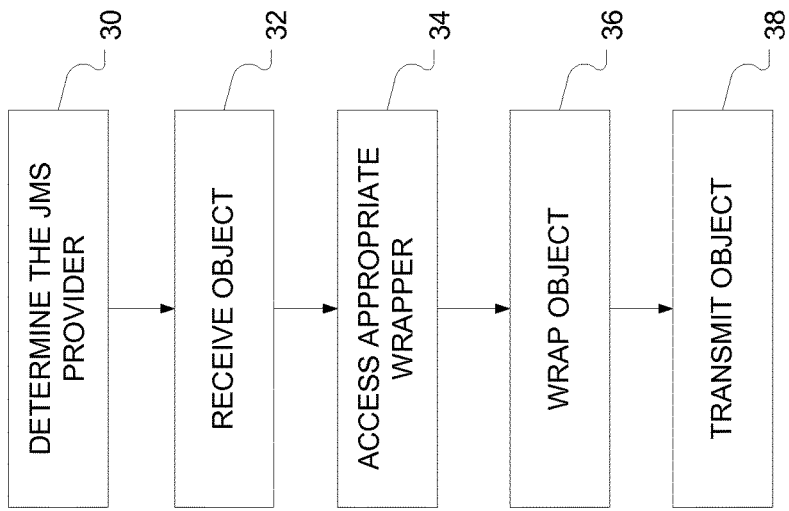
FIG. 3 shows an embodiment of an interaction between a resource adapter and a JMS provider.

The resource adapter manages the message flow across the connection for each of the session, and can do so regardless of the JMS provider. The configuration file ensures that the messages are in the appropriate format for the JMS provider. FIG. 3 shows an embodiment of a process for managing the message flow. At the initial part of the process at 30, the resource adapter will determine the JMS provider. This may occur typically when the JMS and the resource adapter establish communications; the JMS provider may identify itself to the resource adapter. This will allow the resource adapter to access the appropriate wrappers for the appropriate JMS provider.

At 32 the resource adapter receives a call, which arrives in the form of an object. In the case of a messaging operation, the call may be a publish or send, a subscribe or listen, etc. In the case of an initial call, such as a request to establish communications, the call may be a request for a JNDI look up and access to the connection factory, etc. The generic resource adapter 18 may handle both stages of the communication, establishment and operations.

The resource adapter, having received the object, will access the appropriate wrapper at 34, based upon the JMS provider identification mentioned above. The object is then 'wrapped' in the wrapper at 36 and transmitted at 38 to the JMS provider for further processing. This process runs in the opposite direction as well, receiving objects from the JMS system that may need to be unwrapped before being sent to the application.

To aid in understanding of the embodiments, two examples are given below. In one instance, a customer switches JMS providers. In another, a customer switches to a different application server. These examples will be taken in turn, to further demonstrate the flexibility of this system.

In the case of switching JMS providers, the Resource Adapter (RA) allows any JMS-compliant/XA-capable messaging provider to interoperate with any J2CA-compliant application server, as long as an application only makes use of the standard JMS features supported in JAVA™ EE applications. The application server should also use the RA for all of its JMS work, rather than bypassing the RA and directly accessing the JMS provider, one JMS provider may be used in place of another via configuration changes only, without any need to modify the application or switch application servers.

A customer may want to switch JMS providers. In one example, a customer has an existing JAVA™ EE application which is used by many of their employees. Currently employees can only run the application on their x86-based computers, but would like to be able to run them on their ARM-based devices as well. The JMS provider they are currently using depends on EIS components which are x86 executable files. The customer would like to use one of the many JMS providers that are pure JAVA™ and can be run on a JVM™ compiled for ARM.

In another example, a customer has an existing JAVA™ EE application which they have been using for some time.

The customer's business has been growing, and they have been increasing the size of their server cluster to keep up. However, their current JMS provider does not scale well to large clusters and is increasingly becoming a performance bottleneck. The customer would like to use a JMS provider that is designed to provide better scaling on large cluster sizes.

In one embodiment of switching JMS providers, three RA configuration items must be updated: the JNDI, connection factories and destinations. Destinations may be either configured individually or an entire context at a time, as will be discussed in more detail later. In a simple one-JMS-provider-at-a-time configuration case that does not use custom generated wrappers or provider-customization plug-ins, switching from one JMS provider to another may be accomplished solely by replacing the existing configuration data for those three items with configuration data corresponding to the new JMS provider.

The RA uses JNDI to look up JMS provider connection factories and destinations. The environment to use when creating the JNDI InitialContext is as specified by the jndiEnv sub-property within the ResourceProviderDefinitions property in the ra.xml file. A simple example for ResourceProviderDefinitions that sets jndiEnv for the default group is:
 (:jndiEnv=(propertyName1=propertyValue1,
  propertyName2=propertyValue2))
The above example includes two JNDI environment property names and values, but any number (from 0 on up) may be included.

There are some JNDI environment property names defined by the standard JAVA™ APIs such as "java.naming.factory.initial","java.naming.provider.url", "java.naming.security.credentials" and "java.naming.security.principal"). An initial naming factory supplied by and used for a given JMS provider may also accept JMS-provider-proprietary property names. The names and values required to connect to the JMS provider's JNDI are documented by the JMS provider, and the specific values may depend on things such as server names/IP addresses, user names, user passwords. The names and values which would be used when connecting directly to the JMS provider's JNDI without a Resource Adapter are the same names and values which should be used when configuring the Resource Adapters jndiEnv sub-property.

With regard to the connection factories, each Resource Adapter managed connection factory is backed by a JMS provider connection factory. When configuring a managed connection factory, the managed connection factory's RpResourceLocation property is used to indicate the location of the JMS provider connection factory within the JMS provider's JNDI context.

As mentioned above, the changes for destinations may be individual or by contexts. Each Resource Adapter destination (queue/topic) is backed by a JMS provider destination. When configuring an individual Resource Adapter destination, the Resource Adapter destination's RpResourceLocation property is used to indicate the location of the JMS provider destination within the JMS provider's JNDI context.

While each Resource Adapter destination (queue/topic) is backed by a JMS provider destination, the Resource Adapter does not require that each Resource Adapter destination be configured individually. Configuring an entire JNDI subtree at a time may be accomplished by configuring the RpContextLocation on a destination context admin object rather than configuring the RpResourceLocation on an individual destination admin object. Use of this feature requires that the application server's JNDI support a limited form of "JNDI federation" which is not yet standard. However, use of this feature does not necessarily prevent moving to another app-server via configuration changes only, but does require that any current configuration using destination contexts be changed over to using individually configured destinations, if the target app-server does not provide the necessary non-standard JNDI support for destination contexts.

In addition to the above configuration changes, the customer may make further, optional configuration changes. In the simplest case, the Resource Adapter GroupDefinitions property may be left as "(:)" which defines an empty (default) group as having no macros. More advanced GroupDefinitions configurations may define multiple groups, that is, multiple instances of "(:)," with different group names to the left of the ":", and different macros defined to the right of the ":", comma separated, in the form "macroname=macrovalue". These macros may then be invoked in the above RpResourceLocation and RpContextLocation properties by using the macro name surrounded by "{" and "}".

When the RpResourceLocation or RpContextLocation property is evaluated, the macro value is substituted for the macro invocation before being used in any JNDI lookup operation. If this feature is being used to configure one or more JMS providers, then the configuration changes required to accommodate a different or an additional JMS provider need to be modified accordingly. For pure JMS usage, the standard "Generic" wrappers may be used, in which case there is no additional configuration change required to switch JMS providers. However, if custom wrappers are generated for a given JMS provider, either the old one, the new one, or both, then additional configuration changes may be required.

Having shown examples of changes to the JMS provider, the discussion now turns to changing application servers. The conditions under which this may be accomplished are the same as described above for switching JMS providers. The reasons one might want to switch application servers also overlap, such as for different platform support and features switching examples, but with the platform-support/features of the application-server being the issue rather than those of the JMS provider.

In general, the Resource Adapter configuration file need not change when moving from one application server to another. However, the means by which a user configures RpResourceLocation and RpContextLocation properties varies from one application server to the next. Even within a single application server the configuration for connection factories may differ from that of admin objects, such as destinations, so even within a single application server the RpResourceLocation for a connection factory may need to be configured by a different means than the RpResourceLocation for a destination. The ResourceProviderDefinitions property and GroupDefinitions property are defined in the J2EE™ -standards-based ra.xml file, so they can be configured the same way across application servers. App servers may provide app server specific means of overriding them without modifying the ra.xml file and if such an override is used then that needs to be taken into account when switching to a different application server.

The Resource Adapter transforms the sequence of invocations and exceptions from the application server, application and JMS provider into a series of a combination of calls out to and exceptions thrown to those same three entities, in addition to the standard JAVA™ APIs. The Resource Adapter does this in such a fashion that the J2CA, JMS and XA specs are followed, so long as the application server, JMS provider and JVM™ follow their respective specifications.

Generally, the application makes javax.jms.*interface calls to the Resource Adapter, and the Resource Adapter relays those calls to the JMS provider. The application server makes javax.transaction.xa.XAResource interface calls to the Resource Adapter, and the Resource Adapter relays those calls to the JMS provider's XAResource implementation.

However, there are a number of cases the Resource Adapter needs to do more than follow that general approach. For example, on inbound traffic, such as inbound Message Drive Beans (MDBs), the Resource Adapter uses JMS synchronous receives to implement asynchronous MDB listeners. Typically, in the general case, the JMS asynchronous receive mechanism does not provide the necessary facilities to implement MDBs. For example, some MDBs require XA (distributed transaction) support but JMS asynchronous receives do not provide XA support.

The application server manages the life-cycle of Resource Adapter endpoints such as groups of MDB listeners working on behalf of a given MDB implementation, and the Resource Adapter in turn manages the life-cycle of the JMS and XA objects it obtains from the JMS provider. The Resource Adapter can be configured to handle poison messages by sending them to an exception queue possibly using a JMS provider MessageProducer and JMS provider Queue. The Resource Adapter obtains credentials information from the application server and uses that in tandem with a JMS provider ConnectionFactory in order to create JMS connections that are in turn used to perform the MDB's inbound messaging work.

In some instances, connections may need to be cleaned up to eliminate 'dead' or failed connections. When the application server invokes cleanup( )on a Resource Adapter managed connection, the Resource Adapter needs to mark all associated connection handles and derived objects such as session handles, message consumers/producers, queue browsers, etc. as closed. Some of the underlying resources need to be reclaimed as well, including JMS provider message consumers, message producers and queue browsers that need to be closed. This means that the Resource Adapter needs to track all of these objects, and this tracking work is performed any time the application requests one of these objects be created or closed.

Furthermore, since an object such as a connection handle or session handle may be required by J2CA to be considered closed even though the underlying JMS provider object may still be alive and required to be so, this means that many Resource Adapter methods cannot rely on the JMS provider to detect the closed condition and throw a suitable exception. Rather, the Resource Adapter must detect the condition and throw itself.

In this manner, a truly generic resource adapter that interacts with applications running on any vendor's application server and provides communications between those applications and any JMS provider is provided. The resource adapter may receive updating and alterations via the configuration file, thereby avoiding the usually necessary recoding, recompiling and redeploying of a new resource adapter.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system, comprising:
   a processor;
   a wrapper library;
   a resource adapter module in the form of executable code by the processor, the resource adapter module to:
      interact with an application running on an application server by receiving calls from the application; and
      provide communication between the application and any concurrent, class-based, object oriented programming language messaging provider by relaying the calls to the messaging provider, by wrapping the calls from the application in a wrapper from the wrapper library appropriate for the messaging provider to allow the call to be interpreted by the messaging provider;
   a configuration file of code executable by the processor, the configuration file of code including code that identifies a concurrent, class-based, object oriented programming language naming and directory interface, connection factories and destinations, the configuration file of code allowing the resource adapter module to be updated to communicate with at least one new messaging provider by updating the object oriented programming language naming and directory interface, the connection factories, and the destinations for the at least one new messaging provider, and a new application server by updating a resource location and context location without having to be recoded, recompiled and redeployed.

2. The system of claim 1, wherein the resource adapter module to interact with the application comprises receiving sequences of invocations and exceptions from the application server.

3. The system of claim 1, wherein the resource adapter module to provide communication comprises the resource adapter module to generate a series of calls and exceptions to the messaging provider.

4. A computer-controlled method of providing a resource adapter generic to any application server and any provider messaging system, comprising:
   providing the resource adapter usable in an enterprise information system having at least one application server and at least one provider messaging system; and
   providing a configuration file of code executable by the computer to configure the resource adapter to communicate with a new provider messaging system without requiring recoding, recompilation and redeployment of the resource adapter, the configuration file of code including code to:
      identify a concurrent, class-based, object oriented programming language naming and directory interface;
      provide connection factories; and
      identify destinations, wherein the resource adapter is adaptable to any application server, regardless of vendor, and any provider messaging system by changing the object oriented programming language naming and directory interface, the connection factories, and the destinations for the new provider messaging system, and a new application server by updating a resource location and context location.

5. The computer-controlled method of claim 4, further comprising:

receiving a call at the resource adapter running on the computer, the call being in the form of an object, the resource adapter being updatable to communicate with the new provider messaging system through the configuration file of code;

accessing an appropriate wrapper, based upon the new provider messaging system;

wrapping the object in the wrapper and transmitting the wrapped object to the new provider messaging system for further processing.

6. The computer-controlled method of claim 5, wherein the call comprises one of a publish, a send, a subscribe or a listen.

7. The computer-controlled method of claim 5, wherein the call comprises an initial call.

8. The computer-controlled method of claim 7, wherein the initial call comprises a request to establish communications.

9. The computer-controlled method of claim 8, wherein the request comprises one of a request for a concurrent, class-based, object oriented programming language naming and directory interface look up, to look up a destination, or access to a connection factory.

* * * * *

UNITED STATES PATENT AND TRADEMARK OFFICE
CERTIFICATE OF CORRECTION

PATENT NO. : 10,033,790 B2
APPLICATION NO. : 13/872919
DATED : July 24, 2018
INVENTOR(S) : Xiao et al.

Page 1 of 1

It is certified that error appears in the above-identified patent and that said Letters Patent is hereby corrected as shown below:

On the Title Page

On page 2, Column 1, under Related U. S. Application Data, Line 1, delete "61/636,786," and insert -- 61/639,786 --, therefor.

In the Specification

In Column 1, Line 37, delete "13/872,822)," and insert -- 13/872,822, --, therefor.

In Column 7, Line 37, delete "cleanup( )on" and insert -- cleanup() on --, therefor.

Signed and Sealed this
Fourteenth Day of May, 2019

Andrei Iancu
*Director of the United States Patent and Trademark Office*